(12) United States Patent
Bergsten et al.

(10) Patent No.: US 8,345,862 B2
(45) Date of Patent: Jan. 1, 2013

(54) METHOD OF SHARING A STRONG SECRET BETWEEN TWO PARTIES, ONE OF WHOM HAS LITTLE PROCESSING POWER

(75) Inventors: Ulrik Bergsten, Saint-maur des Fosses (FR); Christian Gross, Ableiges (FR); Jacques Thieblemont, Mauguio (FR)

(73) Assignee: Paycool International Limited, Hong Kong (CN)

( * ) Notice: Subject to any disclaimer, the term of this patent is extended or adjusted under 35 U.S.C. 154(b) by 310 days.

(21) Appl. No.: 12/743,712

(22) PCT Filed: Nov. 17, 2008

(86) PCT No.: PCT/FR2008/001614
§ 371 (c)(1),
(2), (4) Date: Aug. 26, 2010

(87) PCT Pub. No.: WO2009/098379
PCT Pub. Date: Aug. 13, 2009

(65) Prior Publication Data
US 2010/0316215 A1 Dec. 16, 2010

(30) Foreign Application Priority Data
Nov. 19, 2007 (FR) ...................................... 07 08102

(51) Int. Cl.
*H04L 9/08* (2006.01)
*H04L 9/28* (2006.01)
*H04L 9/32* (2006.01)

(52) U.S. Cl. ............ 380/28; 380/44; 380/259; 380/282; 713/171

(58) Field of Classification Search .................. None
See application file for complete search history.

(56) References Cited

U.S. PATENT DOCUMENTS
7,221,757 B2 * 5/2007 Alao ............................... 380/37
2006/0083370 A1 * 4/2006 Hwang .......................... 380/28

FOREIGN PATENT DOCUMENTS
WO    WO 2007/044952 A1    4/2007

OTHER PUBLICATIONS

International Search Report (PCT/ISA/210) for PCT/FR2008/001614 dated Aug. 17, 2009.
Written Opinion (PCT/ISA/237) for PCT/FR2008/001614 dated Aug. 17, 2009.
S.M. Bellovin et al., "Encrypted Key Exchange: Password-Based Protocols Secure Against Dictionary Attacks," Proceedings of the Computer Society Symposium on Research in Security and Privacy, May 4-6, 1992, pp. 72-84, vol. Symp. 13, IEEE Comp. Soc. Press, Los Alamitos, US.

* cited by examiner

*Primary Examiner* — Philip Chea
*Assistant Examiner* — Fatoumata Traore
(74) *Attorney, Agent, or Firm* — Buchanan Ingersoll & Rooney PC

(57) ABSTRACT

The invention relates to a method of sharing a strong secret F between two parties (A, B) previously sharing a weak secret F, this method of sharing combining a symmetric algorithm and an asymmetric algorithm, and consisting in using a fixed exponent e of small size, and in encrypting not the exponent e, but the modulus n, by means of the weak secret f.

11 Claims, 1 Drawing Sheet

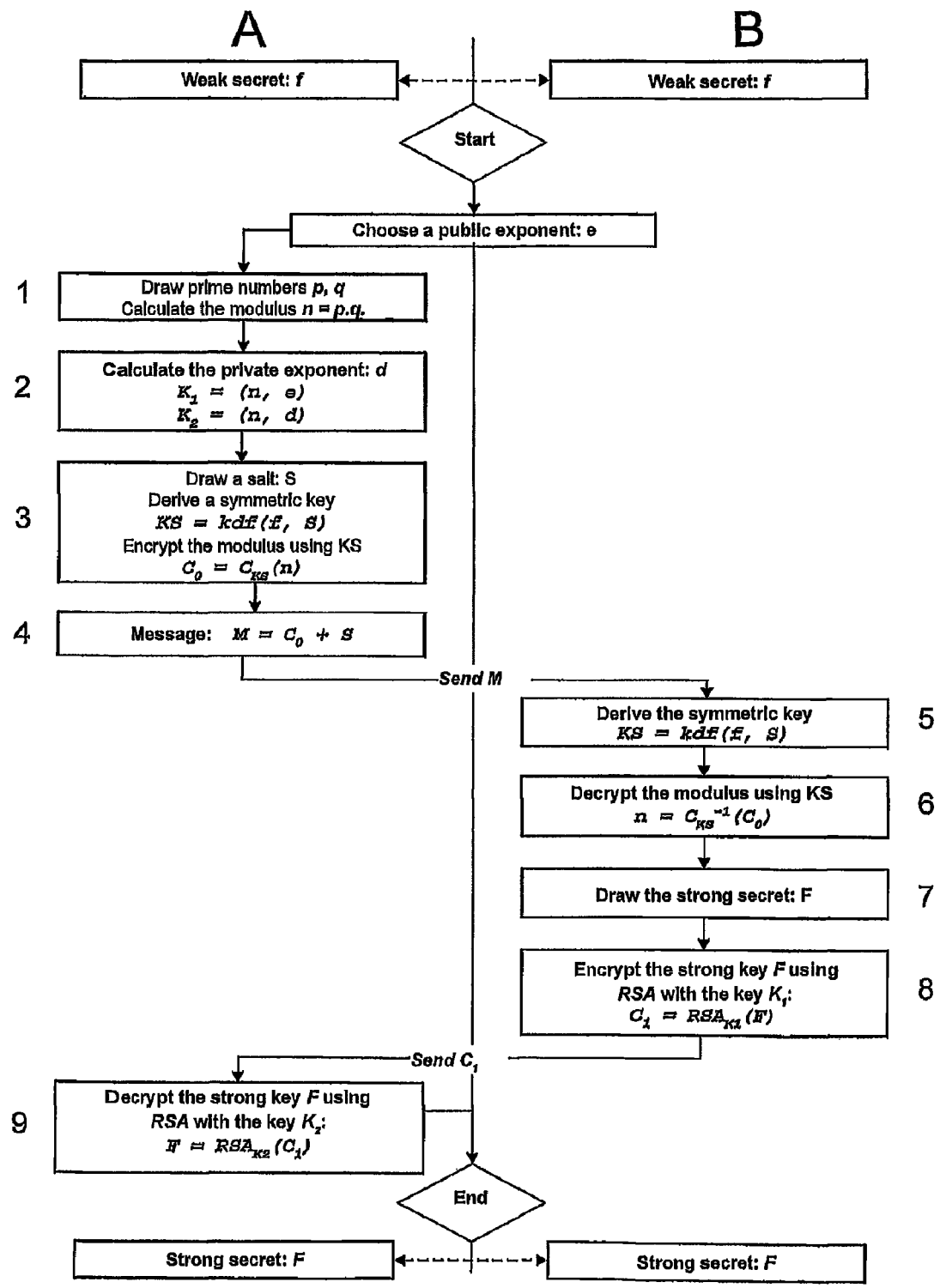

METHOD OF SHARING A STRONG SECRET BETWEEN TWO PARTIES, ONE OF WHOM HAS LITTLE PROCESSING POWER

INTRODUCTION

The present invention relates to a method of sharing a strong secret between two parties, by combining two cryptographic mechanisms, namely a symmetric mechanism and an asymmetric mechanism.

A key transport mechanism is often needed to enable a strong secret, such as a cryptographic key, to be shared between two parties A, B.

STATE OF THE ART

Solutions for making transactions secure that use cryptographic algorithms are known in the state of the art.

In one of the solutions existing in the state of the art, an encrypted secret key is exchanged, the encryption being achieved by means of an asymmetric algorithm using a public key, the asymmetric algorithm typically being of the Rivest, Shamir, and Adelman (RSA) type. In that algorithm:

- a random number and thus the secret is drawn at a first party A;
- the random number is encrypted with the public key of the other party B;
- then A communicates the encrypted secret to B who then merely has to decrypt it, so that the secret is then shared between A and B.

This presupposes firstly that the party A who transmits the secret has the capacity to perform the encryption, and secondly that the party B who receives the encrypted secret itself has the capacity to decrypt the secret received in this way.

Naturally, the strength of the secret shared in this way between A and B is upwardly limited by the strength of the public key that is used. In order to protect the transmission of the secret, it is necessary to use asymmetric keys of sufficient length relative to the strength of the secret. The longer the key, the larger the computing means for performing the encryption or the decryption must be if those operations are to be performed within lengths of time compatible with the expectations of a user.

Below, a secret is deemed to be weak if it can be memorized by an individual, and if it can be attacked by a "brute force" method.

Conversely, a secret is deemed to be strong if its expression is sufficiently long for it to be impossible for a user to memorize, and if it cannot be attacked by a brute force method, with the power of current data-processing means.

It can thus be seen that the above-mentioned known key exchange method that uses an asymmetric algorithm does not pose any particular problem when both of the parties A and B have sufficient computing power to use a public key that is of sufficient strength.

However, a new problem can arise when at least one of the two parties A or B has relatively limited computing means that, per se, do not make it possible to use asymmetric keys guaranteeing a very good level of security during the sharing process.

Such a problem can, in particular, occur when one of the parties is a transaction server, in particular a banking server, deemed suitable for using keys of sufficient strength, while the other party is merely a mobile telephone equipped with a Subscriber Identity Module (SIM) card without a crypto-processor. Unfortunately, that situation can increasingly be encountered in the context of "mobile payment" transactions between a mobile telephone already equipped with such a SIM card, and a payment transaction server.

When encrypting a secret by using a 1024-bit RSA public key, it can be observed that a processing time of about 20 minutes would be necessary on a SIM card without a crypto-processor. Other asymmetric algorithms give results that are substantially equivalent, and, in any event, insufficient to solve the problem.

And yet solving this new problem would make it possible, in particular, to avoid replacing existing SIM cards that are not provided with crypto-processors, there being a large number of such cards in service. It would also make it possible to avoid going over to crypto-processor cards for new SIM cards, given that such crypto-processor cards are significantly more costly.

But the technical problem posed and the solution to it that is considered below are not limited to the particular context of transactions using SIM cards that is cited below merely by way of non-limiting example.

Another problem lies in the size of the code implementing the asymmetric encryption algorithm since it is necessary to optimize its size to the detriment of its rapidity. That problem is also particularly significant in the environment of a SIM card that has only a small amount of memory resources.

An object of the invention is to solve the technical problems posed above.

An object of the invention is thus to propose a method of sharing a strong secret between two parties, at least one of whom has little processing power, which method makes it possible to share a strong secret between said two parties in a time that is sufficiently short, in particular shorter than one minute, to be compatible with the expectations of the users of the method.

A known alternative for shortening the processing time consists in going over from a single pair of asymmetric keys for the entire system to allocation of one pair of keys to each user. That makes it possible to accept a slight weakening in security, thereby making it possible to use shorter keys and thus to shorten the processing time.

But in practice, experiments conducted with 768-bit public keys using a standard SIM-card processor have shown that a processing time of 10 minutes is nonetheless necessary for secret sharing, which is still too long for the mobile payment application under consideration.

In reality, with the power of current processors used in the SIM cards of mobile telephones, only 320-bit keys can be used in an asymmetric cryptographic mechanism of the RSA type without unacceptably lengthening the processing time. But it has become clear that a 320-bit RSA key does not constitute a sufficient obstacle to an attack, even a simple attack, made against the security of the system, even if there are different keys for each user.

With 320-bit keys, security can be compromised by an attack merely using a personal computer (PC) with a few hours of computing, which constitutes an unacceptable risk, even for the security of a single user.

Another alternative that has already been examined in the state of the art consists in reinforcing the strength of an asymmetric algorithm by means of the existence of a weak secret previously shared between the two parties A and B.

The literature has shown that there exists a certain degree of equivalence between the strength of the keys of symmetric algorithms and the strength of the keys of asymmetric algorithms. Thus, it is usually considered that with a 1024-bit RSA key, there is a strength equivalent to an 80-bit key used with a symmetric algorithm.

As a result, it is not possible to transport without loss a secret key of longer than 80 bits by means of it being encrypted using a 1024-bit public key.

Let us assume that such a need arises, without it being possible to use a public key of higher strength, in particular for reasons of insufficient computing power.

Let us also assume that the two parties A and B already share a secret, referred to herein as a "weak" secret, but that, in the application under consideration, can be a six-digit or nine-digit personal identification number (PIN) code.

But it transpires that it is not possible to reinforce the strength of a secret by combining a symmetric mechanism and an asymmetric mechanism directly, because it remains possible to attack the symmetric encryption or the asymmetric encryption independently.

Let us illustrate this impossibility by using RSA cryptography.

Lets us assume that firstly the random number drawn by the first party A is encrypted using the shared weak secret, by means of a symmetric algorithm of the Data Encryption Standard (DES) type or of the Advanced Encryption Standard (AES) type, and that the result is then encrypted using the RSA public key of the other party B. We obtain a secret that is deemed to be strong, and an oracle is supplied by any use of said secret that is deemed to be strong.

Actually, in order to discover the strong secret and thus the random number drawn by A, it suffices to start by factorizing the modulus, which is an active part of the public key, and thus to deduce therefrom immediately the private key of the other party B. It is then possible to decrypt the message, and then to attack the symmetric encryption based, in this example, on a weak secret, by testing the decrypted message relative to the oracle.

Similarly, in the reverse direction, where firstly the random number drawn by A is encrypted using the public key before being over-encrypted using the weak secret, we arrive at the same weakness, i.e. here too, it is possible to attack the two encryptions independently.

This is merely due to the very principle of the asymmetric algorithm, also known as the "public-key algorithm".

It is thus possible for the private key corresponding to the public key to be found indirectly not only by solving a discrete logarithm based on an oracle but also directly by factorizing the modulus common to the public key and to the private key.

A known alternative, described in the article entitled "Encrypted Key Exchange: password-based protocols secure against dictionary attacks", by Steven M. Bellovin and Michael Merritt, published in the "Proceedings of the IEEE Symposium on Research in Security and Privacy, Oakland, May 1992", consists in proposing a solution making it possible for both of the parties A and B to agree, in fully secure manner, on a strong secret built by combining a symmetric mechanism using the weak secret with an asymmetric mechanism of strength lower than the strength of the strong secret.

In order to avoid the difficulty mentioned, the alternative described in the article by Bellovin & Merritt implements the idea of keeping the "public key" of A secret by communicating it to the other party B in a form encrypted using the weak secret.

However, an RSA public key is made up firstly of a modulus n that is a factor of two prime numbers, and secondly of an exponent e. Bellovin & Merritt considered that, in order to be effective, encrypting the RSA public key using a weak secret should be applied to elements that it is not possible to distinguish from a random number. Hence their choice of encrypting the exponent e, chosen randomly, rather than the modulus n. Unfortunately, by taking an exponent that is random and thus potentially and probably large, the encryption time on a SIM without a crypto-processor remains prohibitive. In addition, since the modulus is communicated unencrypted and is of relatively small size, it is easy and quick to factorize it independently, leaving it open to brute force attack on the weak secret alone. Therefore, following the path indicated by that article does not make it possible to solve the problem posed.

On the contrary, the principle of the invention is to explore the path discarded by Bellovin & Merritt, and thus to encrypt the modulus rather than the exponent, and to do so using the weak secret. In addition, instead of using a random and potentially large exponent, the invention proposes to use a small and fixed exponent, e.g. 3, that remains public.

In this context, it is demonstrated below that combining the symmetric mechanism and the asymmetric mechanism does indeed, as predicted by Bellovin & Merritt, give rise to a loss of strength of the secret, but that this loss remains acceptable in the context of the applications being considered, and even that it is possible to compensate for the loss of strength.

DETAILED DESCRIPTION OF THE SOLUTION PROPOSED BY THE INVENTION

The method of the invention is described in more detail below with reference to FIG. 1.

Let there be two parties A and B who previously share a weak secret, referenced f, e.g. a password of a few digits, in particular a password of in the range 6 digits to 9 digits, i.e. of in the range 20 bits to 30 bits in binary code. The weak secret f is preferably to be used once only for a given user, thereby avoiding the possibility of "partition attacks".

The objective is for A and B to agree, in fully secure manner, on a strong secret, referenced F, by using the weak secret f and a pair of RSA keys of strength less than the strength of the target strong secret F.

The method starts with a step consisting in choosing a public exponent e of small size, which exponent is a parameter of the method. For example, for e, a value from among the following values is chosen: 3, 17, 65537.

Then, the method consists in having the following operations performed by the parties (A, B):

A performs the following operations:
1. randomly drawing two prime numbers p, q of sufficient size, and calculating a modulus n=p*q, the sign * being used herein to designate the operation of multiplication;
2. from the modulus n and from the exponent e, building a pair of keys of the asymmetric algorithm, namely a public key $K_1$=(n, e) and a private key $K_2$=(n, d), where d is the private exponent corresponding to the public exponent e, namely d=$e^{-1}$ modulo (p−1)*(q−1);
3. drawing a random number for use as a salt S, and encrypting the modulus n using the symmetric algorithm by using as a key a key KS derived from the weak secret f and from the salt S by means of a function of the kdf(f,S) type; and
4. concatenating the salt S and the resulting encrypted modulus n (referenced $C_0$) and transmitting to B the resulting message M=$C_0$+S.

Then B responds to the message M transmitted by A by communicating this encrypted strong secret F, optionally with formatting bits being added, by means of the public key $K_1$ constituted by the pair (n, e). In detail, B performs the following operations:

5. deriving the key KS from the weak secret f, and from the salt S extracted from the message M transmitted by A by means of a function of the kdf(f,S) type;
6. decrypting the modulus n as encrypted by A, by means of the symmetric algorithm and by using as a key said key KS;
7. drawing a random number that constitutes the strong secret F; and
8. encrypting the strong secret F, optionally with formatting bits being added, by means of the asymmetric algorithm and of the public key $K_1=(n, e)$ and communicating to A the strong secret F as encrypted, referenced $C_1$.

Finally, A performs the following operations:

9. decrypting the encrypted strong secret $C_1$ as transmitted by B, by means of the asymmetric algorithm, by using the private key $K_2=(n, d)$, and by leaving aside any formatting bits.

As a result, at the end of the processing by A and by B, both of the parties A and B are in possession of the strong secret F that is then shared.

In a preferred embodiment of the invention, the asymmetric algorithm is of the RSA type. The symmetric algorithm is, in particular of the DES type or of the AES type.

In an advantageous variant of the invention, instead of encrypting a modulus n=p*q, the first party A computes n1=(n−1)/2 and applies to n1 the step of encryption using the symmetric algorithm, and the party B then reconstructs the modulus n by computing n=n1*2+1.

This makes it possible to encrypt a quantity n1 that cannot be presumed to be even although n, since it is the product of two large prime numbers, is odd.

The method of the invention is particularly suitable for when one of the parties (A) is a server, in particular a mobile payment transaction server, the other party (B) being a party with limited computing resources, such as, for example, a microprocessor card, in particular a SIM card.

Analysis of the Solution:

A third party could observe the exchanges between A and B but it is assumed that the third party does not know their weak secret f.

The third party cannot directly factorize the modulus n (which is encrypted) and thereby determine the private key enabling said third party to discover the strong secret F transmitted by B to A.

The third party does not known the modulus n, since said modules is dynamic and specific to each user, and is communicated as encrypted by A to B.

Said third party has to test all of the possible combinations of the weak secret f, which then gives possible moduli. But the third party must then factorize each of the candidate moduli in order then to be capable of discovering the strong secret F by decryption.

In other words, the strengths of the weak secret f and of the pair of RSA keys used are indeed combined, i.e. they are added together.

Combining them does however give rise to a certain amount of loss of strength D because the third party could rapidly eliminate intermediate candidates insofar as they are not often products of two prime numbers, each of which is of significant size, as with a modulus used for a pair of RSA keys.

Assessment of the Loss of Strength:

Let us start from the well-known prime number theorem on the density of prime numbers (i.e. the number of prime numbers less than a number X, the resulting number then being divided by X): this density tends towards 1/Ln X.

In RSA cryptography, the modulus is the product of 2 prime numbers.

Hence the question: what is the probability that a number X can be expressed in the form of a product of 2 prime numbers?

In order to attempt to answer this question, the idea is, rather than seeking to estimate directly the probability P in question, to reason in terms of generating a number X of a size N (N being its size in number of bits) on the basis of two factors.

It is assumed that, in order to be difficult to factorize, the smallest factor should be a prime number and of a size, for example, greater than N/3, with T being its size (lying in the range N/3 to N/2).

The probability of such a number being prime is of the order of $1/Ln\ 2^T$.

The remainder is of a size of the order of N−T.

The probability of the remainder being prime is of the order of $1/Ln\ 2^{(N-T)}$.

In all, the probability is $1/(Ln\ 2^T * Ln\ 2^{(N-T)})$.

Then, in order to compute the entire probability P, it suffices to cause T to vary from N/3 to N/2 by summing the partial results.

$Ln\ 2^T = T * Ln\ 2$ and $Ln\ 2^{(N-T)} = (N-T) * Ln\ 2$. The partial result can thus be written: $1/(Ln\ 2)^2/(T*(N-T))$.

It is known that the sum for T varying from N/3 to N/2 of $1(T*(N-T))$ is approached by the integral of N/3 to N/2 of $dt/(t*(N-t))$.

To compute this integral, a change of variable is made: let $t=N/2*(1-x)$ and it remains to compute the integral from ⅓ to 0 of $-2/N/(Ln\ 2)^2 * dx/(1-x^2)$.

The primitive of $dx/(1-x^2)$ is $\frac{1}{2}*Ln((1+x)/(1-x))$.

Hence the result of the computation of the integral, i.e. P: 1/N/Ln 2 or indeed $1/Ln\ 2^N$, i.e. precisely the density of the prime numbers less than or equal to $2^N$.

Actually, if the criterion of size T of the smallest prime factor varies, it can be seen that, in all cases, the sought-for probability remains proportional to the density of the prime numbers less than or equal to $2^N$, the proportionality factor not depending on N.

Thus, with a threshold for T of N/3, the proportionality factor is Ln2/Ln2, i.e. 1. With a threshold of N/4, the proportionality factor goes to about 1.6(Ln3/Ln2). With a threshold of N/5, we obtain 2(Ln4/Ln2). And with a threshold of N/6, the proportionality factor increases to about 2.3(Ln5/Ln2). And so on.

This rather remarkable result represents the probability of coming across a number that is the product of 2 large prime numbers.

The lower this probability, the higher the loss. This is because it reduces accordingly the number of attempts to be made to reach the end of a brute force attack.

The number of loss bits D is given by the following relationship:

$$1/P = 2^D$$

In the variant when n1 is encrypted rather than n, the loss is reduced by 1 bit (the probability P is doubled).

In practice this means that by implementing the present solution with a pair of RSA keys of length N bits, and by choosing the prime number p to be of random length lying in the range N/2 and N/5 (thus, the prime number q is of length complementary to N) 1/P is of the order of N*Ln 2/2/2, i.e. N*Ln 2/4.

For example, by taking N=1024, we have 1/P equal to about 179, and thus lying in the range $2^7$ to $2^8$, hence a loss D of 8 bits at the most.

With other examples for N:

if N is 320 bits, the loss of strength due to the combination is equivalent to 6 bits in symmetric; and if N is 512 bits, the loss is equivalent to 7 bits in symmetric.

In other words, by combining symmetric encryption by means of a weak secret f of, for example, 30 bits (i.e. approximately a PIN of 9 decimal digits) and asymmetric encryption by means of a pair of 1024-bit keys, equivalent to a strength of 80 bits in symmetric, we obtain, in total, a strength of 30+80−8=102 bits in symmetric.

It should be noted that, in an aspect of the invention, it is possible to compensate for this loss of strength by D bits by providing $2^D$ loops in the derivation of the key from the salt and from the weak secret f. This method is known as "password-based key derivation function." In the above example, where N is equal to 1024 and D=8, we thus obtain a strength of 30+80−8+8=110 bits in symmetric, i.e. approximately the strength of the Triple-DES.

This strength is sufficient to withstand all known attacks with current computing resources and with computing resources that are foreseeable in the medium term.

Advantages of the Invention:

The invention makes it possible to achieve the set object, so that it is possible to compute and to transport a strong secret F between two parties A, B, while also ensuring that the computation load on the weak party B remains less than the computation load that would be necessary by using an asymmetric algorithm alone for computing and transferring the strong secret.

In other words, it is genuinely possible to add the strength of the weak secret f to the strength of the pair of RSA keys while optimizing the execution time and the size of the code on the customer side. This can be advantageous, in particular, when the customer is implemented in a SIM card without a crypto-processor but that does have a high-performance DES engine.

The invention claimed is:

1. A method of sharing a strong secret F between two parties (A, B) who previously share a weak secret f, said method comprising the initial step of choosing a public exponent e of small size, and further comprising the following steps performed by the parties (A, B):

for A:

1. randomly drawing two prime numbers p, q, and calculating a modulus n=p*q;

2. from the modulus n and from the exponent e, building a pair of keys of an asymmetric algorithm, namely a public key $K_1$=(n, e) and a private key $K_2$=(n, d), where d is the private exponent corresponding to the public exponent e;

3. drawing a first random number for use as a salt S, and encrypting the modulus n using a symmetric algorithm by using a key KS derived from the weak secret f and from the salt S; and 4. concatenating the salt S and the resulting encrypted modulus n ($C_0$) and transmitting to B the resulting message M.

for B:

5. deriving the key KS from the weak secret f, and from the salt S extracted from the message M transmitted by A;

6. decrypting the modulus n as encrypted by A, by means of the symmetric algorithm and by using said key KS;

7. drawing a random number that constitutes the strong secret F; and 8. encrypting the strong secret F by means of the asymmetric algorithm and of the public key $K_1$=(n, e) and communicating to A the strong secret F as encrypted; and for A:

9. decrypting the strong secret F as transmitted encrypted by B, by means of the asymmetric algorithm, by using the private key $K_2$=(n, d), so that at the end of the processing by A and by B, both of the parties A and B are in possession of the strong secret F.

2. A method according to claim 1, wherein the asymmetric algorithm is of the Rivest, Shamir, Adelman (RSA) type.

3. A method according to claim 1, wherein the symmetric algorithm is of the DES or AES type.

4. A method according to claim 1, wherein instead of encrypting a modulus n=p*q, the first party A computes n1=(n−1)/2 and applies to n1 the step of encryption using the symmetric algorithm, and the party B then reconstructs the modulus n by computing n=n1*2+1.

5. A method according to claim 1, further comprising a step of reinforcing by D bits the strength of the strong secret by using $2^D$ loops in the step of computing the key derived from the salt S and from the weak secret f.

6. A method according to claim 1, wherein the party (A) is a server.

7. A method according to claim 6, wherein the other party (B) is a party with limited computing resources.

8. A method according to claim 7, wherein the other party (B) is a microprocessor card.

9. A method according to claim 1, wherein the public exponent takes one of the values from among 3, 17, and 65537.

10. A method according to claim 6, wherein the server is a mobile payment transaction server.

11. A method according to claim 8, wherein the microprocessor card is a SIM card.

* * * * *